US010021854B2

(12) United States Patent
Cantwell et al.

(10) Patent No.: US 10,021,854 B2
(45) Date of Patent: *Jul. 17, 2018

(54) ANIMAL ENCLOSURE WITH DUAL DOOR ASSEMBLY

(71) Applicant: Mid-West Metal Products Company, Inc., Muncie, IN (US)

(72) Inventors: Brad Cantwell, Muncie, IN (US); Stew Kerr, Muncie, IN (US); Michael E. Greene, Muncie, IN (US); Terrance L. Jones, Muncie, IN (US)

(73) Assignee: MID-WEST METAL PRODUCTS CO., INC., Muncie, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/250,167

(22) Filed: Aug. 29, 2016

(65) Prior Publication Data

US 2016/0366848 A1    Dec. 22, 2016

Related U.S. Application Data

(60) Division of application No. 14/743,131, filed on Jun. 18, 2015, now Pat. No. 9,737,044, which is a
(Continued)

(51) Int. Cl.
*A01K 1/00* (2006.01)
*A01K 1/02* (2006.01)
(Continued)

(52) U.S. Cl.
CPC .............. *A01K 1/0017* (2013.01); *A01K 1/02* (2013.01); *A01K 1/0245* (2013.01); *A01K 1/033* (2013.01);
(Continued)

(58) Field of Classification Search
CPC ..... A01K 1/0017; A01K 1/0035; A01K 1/034
See application file for complete search history.

(56) References Cited

U.S. PATENT DOCUMENTS 899,084 A * 9/1908 Thoits et al. ........... E05C 19/14
220/324
1,825,504 A   9/1931 Carr
(Continued)

FOREIGN PATENT DOCUMENTS

GB          2238296 A      5/1991

OTHER PUBLICATIONS

Precision Pet Products, Inc.; Wire Crates, Exercise Pens and Accessories; published at least as early as 2007.
(Continued)

*Primary Examiner* — Lisa L Tsang
(74) *Attorney, Agent, or Firm* — Taft Stettinius & Hollister LLP; Stephen F. Rost

(57) ABSTRACT

An animal enclosure including a plurality of members defining an interior of the enclosure. One of the plurality of members includes a first member having a frame structure and door assembly formed by a plurality of interconnected horizontal and vertical wires. At least two of the horizontal wires of the frame structure form a hook positioned inside the defined opening. The door assembly is coupled to the frame and moves between an open and close positions. The door assembly includes a first door and a second door removably coupled to one another. The enclosure also includes a latch assembly for releasing the door assembly from the frame structure. In the close position, at least one horizontal wire of the first door and at least one horizontal wire of the second door are coupled to the hooks formed by the at least two horizontal wires of the frame structure.

15 Claims, 8 Drawing Sheets

Related U.S. Application Data continuation of application No. 13/911,167, filed on Jun. 6, 2013, now Pat. No. 9,357,748, which is a continuation-in-part of application No. 13/759,570, filed on Feb. 5, 2013, now Pat. No. 9,420,757.

(51) Int. Cl.

| | | |
|---|---|---|
| A01K 1/03 | (2006.01) | |
| A01K 31/08 | (2006.01) | |
| E05B 61/00 | (2006.01) | |
| E05C 1/08 | (2006.01) | |
| E04H 17/02 | (2006.01) | |
| E05C 3/12 | (2006.01) | |
| E05C 19/12 | (2006.01) | |
| E06B 11/02 | (2006.01) | |
| A01K 1/035 | (2006.01) | |
| E05B 65/06 | (2006.01) | |
| E05C 3/04 | (2006.01) | |

(52) U.S. Cl.
CPC .............. *A01K 1/034* (2013.01); *A01K 1/035* (2013.01); *A01K 31/08* (2013.01); *E04H 17/02* (2013.01); *E05B 61/00* (2013.01); *E05B 65/06* (2013.01); *E05C 1/08* (2013.01); *E05C 3/04* (2013.01); *E05C 3/124* (2013.01); *E05C 19/12* (2013.01); *E06B 11/021* (2013.01); *Y10S 292/29* (2013.01); *Y10T 292/0862* (2015.04); *Y10T 292/0953* (2015.04)

(56) References Cited

U.S. PATENT DOCUMENTS

| | | | |
|---|---|---|---|
| 3,556,058 | A | 1/1971 | Smiler |
| 3,791,347 | A | 2/1974 | Lovell |
| 3,896,766 | A | 7/1975 | Martin |
| 4,023,698 | A | 5/1977 | Joseph |
| 4,629,086 | A | 12/1986 | Trubiano |
| 4,763,606 | A | 8/1988 | Ondrasik |
| 4,770,127 | A | 9/1988 | Volk |
| 5,101,995 | A | 4/1992 | Trubiano |
| 5,233,939 | A | 8/1993 | Randolph |
| 5,373,810 | A | 12/1994 | Martin |
| 5,549,073 | A | 8/1996 | Askins et al. |
| 5,626,098 | A | 5/1997 | Askins et al. |
| D384,443 | S | 9/1997 | Olfert |
| 5,845,432 | A | 12/1998 | Tully et al. |
| 5,943,982 | A | 8/1999 | Askins et al. |
| 6,092,488 | A | 7/2000 | Allawas |
| 6,192,834 | B1 | 2/2001 | Kolozsvari |
| 6,581,545 | B1 | 6/2003 | Foster |
| 6,681,720 | B1 | 1/2004 | Skurdalsvold et al. |
| 6,883,463 | B2 | 4/2005 | Link |
| 7,918,188 | B1 | 4/2011 | Harper |
| 8,408,416 | B2 | 4/2013 | Cheng-Lung et al. |
| D697,273 | S | 1/2014 | Cantwell et al. |
| 2004/0134444 | A1 | 7/2004 | Shiever et al. |
| 2005/0034679 | A1 | 2/2005 | Link |
| 2005/0284405 | A1 | 12/2005 | Pomakoy-Poole et al. |
| 2007/0000447 | A1 | 1/2007 | Jakubowski et al. |
| 2008/0245313 | A1 | 10/2008 | Jakubowski et al. |
| 2010/0282179 | A1 | 11/2010 | Ho |
| 2012/0227328 | A1 | 9/2012 | Link |
| 2012/0227675 | A1 | 9/2012 | Link et al. |
| 2014/0033611 | A1 | 2/2014 | Link |

OTHER PUBLICATIONS

Midwest Homes for Pets; Championship Collection; published at least as early as 1992.
Midwest Homes for Pets; product description sheet; published at least as early as 1995.
Doskocil; The First and Only Large Collapsible Plastic Crates.; published at least as early as 1995.
GoGo Pet Products Double Door Black Epoxy Folding Wire Crate, 24-Inch; last accessed from: http://www.amazon.com/dp/B000J3YE0U/ref=twister_B00B4QL13E?_encoding=UTF8 &psc=1 on Sep. 25, 2015; on sale at least by Dec. 19, 2006.
Extended European Search Report, dated Mar. 23, 2015; 8 pages; issued by the European Patent Office.

* cited by examiner

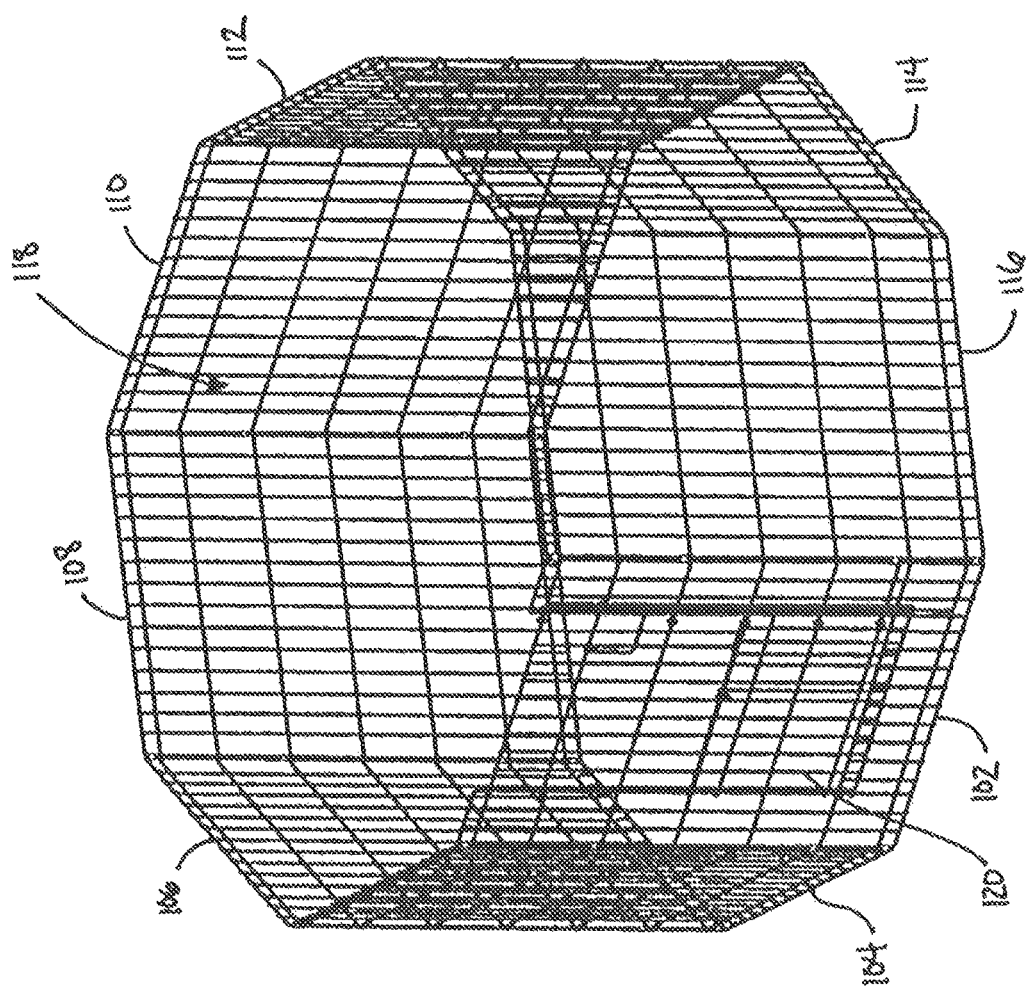
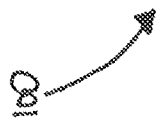
FIGURE 1

ANIMAL ENCLOSURE WITH DUAL DOOR ASSEMBLY

RELATED APPLICATIONS

This application is a divisional of U.S. patent application Ser. No. 14/743,131, filed Jun. 18, 2015 entitled "Animal Enclosure with Dual Door Assembly", which is a continuation of U.S. patent application Ser. No. 13/911,167, filed Jun. 6, 2013 entitled "Animal Enclosure with Dual Door Assembly", which is a continuation-in-part of U.S. patent application Ser. No. 13/759,570, filed Feb. 5, 2013 entitled "Animal Enclosure with Dual Door Assembly", the disclosures of which are hereby incorporated by reference in their entirety.

FIELD OF THE DISCLOSURE

The present disclosure relates to an animal enclosure, and in particular to an enclosure having a dual door assembly.

BACKGROUND

The use of animal cage is well known in the prior art. Many conventional cages have been developed over the years for housing animals of different sizes, and through the development of these cages flexibility and portability have become points of emphasis. Some conventional cages, for example, have been designed to collapse to a compact position for portability. Others have been designed of light weight and from durable materials. Conventional cages have been designed for ease of transporting an animal. Some conventional cages are designed as exercise pens that provide an interior space that the animal can move about, particularly outdoors.

Most conventional cages include at least one door for providing access to the interior of the cage. An animal can enter or exit the cage through the opening when the door is opened, and the animal can be safely contained in the cage when the door is closed. Many conventional cages include a door that is attached to the cage via a hinge. This allows the door to be swung open and close. A variety of latches have been incorporated into the design of the door to allow a user to open or securely lock the door.

Many of these conventional designs have limitations, however. With regards to an exercise pen, for example, the door is generally formed by an entire height and width of a panel or side member of the pen. Many of these doors are not able to be securely latched or may not prevent an animal from escaping therefrom. In addition, due to the size of the door, it can be difficult for an owner to reach into the interior of the exercise pen and retrieve a desired animal when two or more animals are enclosed therein.

Therefore, a need exists for an improved animal enclosure that can be collapsible, portable, and provides better means for accessing the interior of the enclosure which overcomes some of the above-mentioned limitations in the prior art.

SUMMARY

In one embodiment of the present disclosure, an animal enclosure is provided. The enclosure includes a plurality of members defining an interior of the enclosure, where the plurality of members includes at least a first member. A frame structure of the first member has a plurality of interconnected horizontal and vertical wires that define an opening for an animal to pass therethrough and enter or exit the interior of the enclosure. At least two of the horizontal wires of the frame structure form a hook positioned inside the defined opening. The enclosure also includes a door assembly of the first member having a plurality of interconnected horizontal and vertical wires and being coupled to the frame structure. The door assembly is pivotable about and slideable along a vertical pivot wire of the frame structure to move between an open position and a close position, where the door assembly includes a first door and a second door removably coupled to one another. A latch assembly is also provided and includes a first end, a second end, and a substantially U-shaped structure therebetween, where the first end and second end are pivotally coupled to a horizontal wire of the door assembly. In the close position, at least one horizontal wire of the first door and at least one horizontal wire of the second door are coupled to the hooks formed by the at least two horizontal wires of the frame structure.

In one aspect, the latch assembly is formed by a single wire. In another aspect, the first end and second end of the latch assembly are bent to define an opening for receiving the horizontal wire of the door assembly. In a further aspect, a horizontal wire of the frame structure is disposed in the opening defined in the second end of the latch assembly in the close position. In a different embodiment, a first mechanism is integrally coupled to the first door and a second mechanism is integrally coupled to the second door. Here, when the first door and second door are coupled to one another, the first mechanism is disposed in contact with the second door and the second mechanism is disposed in contact with the first door.

The animal enclosure may also include a vertical wire of the first door having a hooked end that overlaps and contacts a portion of the first door in the close position. In yet another aspect, the enclosure includes a clip coupled to the second door. The clip can be integrally formed by a vertical wire of the second door. Moreover, a horizontal wire of the first door can be removably coupled to the clip when the first door and second door are coupled to one another.

In another embodiment, a side member is provided for an exercise pen for accommodating an animal. The side member includes a frame structure having a plurality of interconnected horizontal and vertical wires that define an opening for an animal to pass therethrough and enter or exit the exercise pen. The frame structure includes an outer frame wire, a vertical pivot wire, and a first horizontal wire. The side member also includes a door assembly having a plurality of interconnected horizontal and vertical wires and being coupled to the frame structure. The door assembly is pivotable about and slideable along the vertical pivot wire to move between an open position and a close position. The door assembly includes a first door and a second door removably coupled to one another. The side member further includes a latch assembly having a first end, a second end, and a handle portion therebetween, where the first end and second end are pivotally coupled to a horizontal wire of the door assembly. The first end and second end of the latch assembly are bent to define an opening for receiving the horizontal wire of the door assembly and, in the close position, the first horizontal wire of the frame structure is disposed in the opening defined in the second end of the latch assembly.

In one aspect of this embodiment, the latch assembly is formed by a single wire. In another aspect, at least two of the horizontal wires of the frame structure each form a hook. Each hook can be positioned inside the defined opening. Moreover, in the close position, at least one horizontal wire of the first door and at least one horizontal wire of the second door are coupled to the hooks formed by the at least two horizontal wires of the frame structure.

In a different aspect, a first mechanism is integrally coupled to the first door and a second mechanism is integrally coupled to the second door. Here, when the first door and second door are coupled to one another, the first mechanism is disposed in contact with the second door and the second mechanism is disposed in contact with the first door. In addition, a vertical wire of the first door can have a hooked end that overlaps and contacts a portion of the first door in the close position. In a further aspect, a vertical wire of the second door has one end bent downwardly to form a clip. The vertical wire is coupled to an upper-most horizontal wire of the second door. A bottom-most horizontal wire of the first door can be removably coupled to the clip when the first door and second door are coupled to one another.

In a different embodiment of the present disclosure, a door assembly is provided for an exercise pen for accommodating an animal. The door assembly includes a frame structure having a plurality of interconnected horizontal and vertical wires that define an opening for an animal to pass therethrough. The frame structure includes a vertical pivot wire and at least two of the horizontal wires form an upright hook disposed inside the defined opening. The door assembly also includes a first door having a plurality of interconnected horizontal and vertical wires. Each of the plurality of horizontal wires includes a curled end that defines an opening for receiving the vertical pivot wire such that the first door is pivotable about and vertically slideable about the vertical pivot wire. The door assembly further includes a second door having a plurality of interconnected horizontal and vertical wires. Each of the plurality of horizontal wires includes a curled end that defines an opening for receiving the vertical pivot wire such that the second door is pivotable about and vertically slideable about the vertical pivot wire. At least one horizontal wire of the first door and at least one horizontal wire of the second door are coupled to the upright hooks formed by the at least two horizontal wires of the frame structure.

In one aspect of this embodiment, the door assembly includes a vertical wire of the second door having a hooked end that overlaps and contacts a portion of the first door in the close position. In another aspect, a vertical wire of the second door has one end bent downwardly to form a clip. The clip engages a horizontal wire of the first door when the first door and second door are coupled to one another.

In a different aspect, the door assembly can be configured in a first configuration and a second configuration. In the first configuration, the first door and second door are engaged to one another such that a vertical wire of the first door is disposed in an opening defined between a transverse loop wire and the second door; a vertical wire of the second door has a bent end forming a downwardly facing clip, where the clip engages a horizontal wire of the first door; and the first door and second door are moveable about the vertical pivot wire of the frame structure in a substantially concomitant relationship to one another. In the second configuration, the first door and second door are disengaged from one another such the vertical wire of the first door is removed from the opening defined between the transverse loop wire and the second door; the horizontal wire of the first door is disengaged from the clip; and the first door and second door are moveable relative to one another about the vertical pivot wire.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 1 is a perspective view of an animal enclosure;

Corresponding reference numerals are used to indicate corresponding parts throughout the several views.

DETAILED DESCRIPTION

Figure 2:
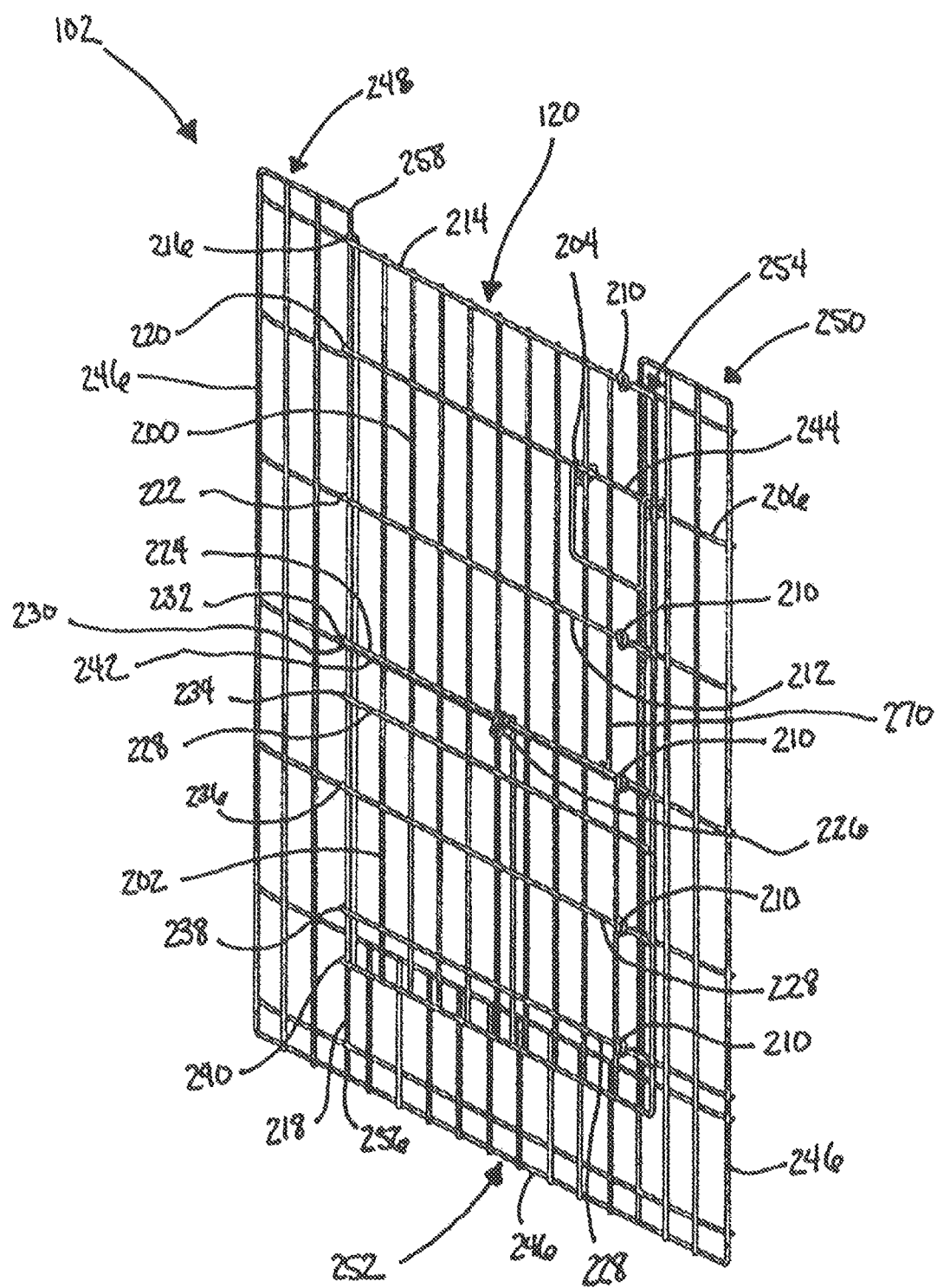
FIG. 2 is a perspective view of a door frame and door assembly of the animal enclosure of FIG. 1 in a close position.

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The present disclosure relates to a collapsible animal enclosure. The animal enclosure can be used for multiple purposes, such as to contain an animal or another object. The enclosure can be made of any size for accommodating an object of any size. In addition, the enclosure can be made of different materials including aluminum, plastic, and steel. The enclosure can be designed as an animal crate for defining an interior that is surrounded at all sides, or it can be designed as an exercise pen in which at least one side is uncovered.

Referring to FIG. 1, an embodiment of an animal enclosure 100 is shown. The enclosure 100 is in the form of an exercise pen, but this is only intended to be an example. The enclosure 100 can be formed of substantially horizontal and vertical wires that overlap one another to define an interior portion 118. One or more of the horizontal wires can be coupled to one or more of the vertical wires, and vice versa, to add structural integrity to the enclosure 100. For instance, the wires may be welded, adhered, fastened, or coupled to one another through a variety of means. The enclosure 100 can include a plurality of sides or members that form the enclosure 100.

In FIG. 1, for example, the enclosure includes a first member 102, a second member 104, a third member 106, a fourth member 108, a fifth member 110, a sixth member 112, a seventh member 114, and an eighth member 116. Each individual member can be coupled to an adjacent member via a fastener, clip, latch, or other means. For instance, in FIG. 1, each member is coupled to an adjacent member by use of one or more clips. Vertical wires of the respective member can be rotatably disposed within the clip to allow the enclosure, of any number of sides, to be configured in a desired manner. While the illustrated embodiment depicts eight sides, other embodiments may include any number of sides. In this manner, a user may assemble the enclosure to any desired shape based on the size of the animal, object, etc. being contained therein.

With respect to the enclosure 100, the first member 102 is shown having a door assembly 120. The door assembly 120 can be coupled to a frame defined by the first member 102 such that the door assembly 120 can be configured between an open position and a close position. For instance, the door assembly 120 can be pivotally coupled to the frame so that the door assembly 120 can pivot between said positions. Moreover, other members can include a door assembly. Although only one door assembly 120 is shown in FIG. 1, in other embodiments there can be two or more door assemblies for accessing the interior 118 of the enclosure 100.

Referring to FIGS. 2-8, the first member 102 and its door assembly 120 is shown in greater detail. The door assembly 120 can be formed as a single or dual door assembly. In FIG. 2, the door assembly 120 includes a first door 200 and a second door 202. Here, the first door 200 and second door 202 can be moved between a close position (e.g., FIG. 2) and a substantially open position (e.g., FIG. 5). Moreover, one of the first door 200 and second door 202 can be moved between the open position and close position relative to the other door (e.g., FIG. 6).

The first door 200 can include a handle or latch assembly 204 for releasably engaging with the first member 102. The latch assembly 204 can be disposed in an engaged position (e.g., FIG. 2) with a first horizontal wire 206 of the first member 102. To open the first door 200 or the door assembly 120, the latch assembly 204 can be moved along direction 300 to an unlatched or disengaged position (e.g., FIG. 3).

Figure 8:
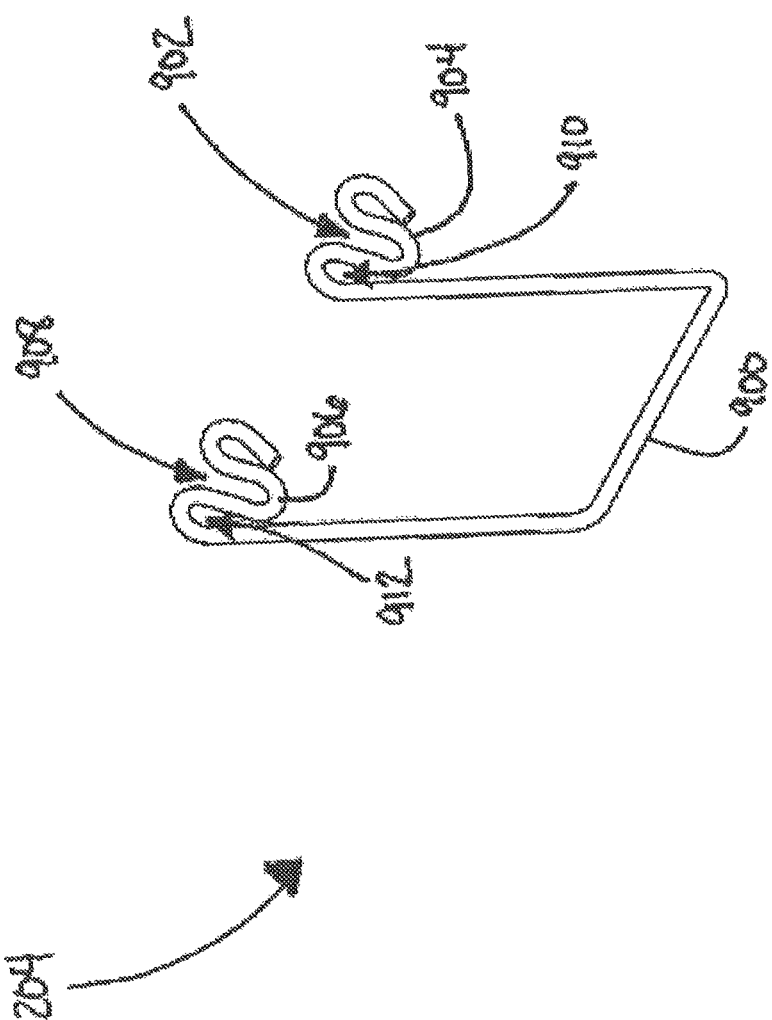
FIG. 8 is a perspective view of the latch of FIG. 3.

Referring to FIG. 8, the latch assembly 204 can include a handle portion 900. The entire latch assembly 204 can be formed by a single wire, for example, or two or more wires may be coupled to one another to form the assembly 204. In FIG. 8, the handle portion 900 is formed as a substantially U-shaped member. The latch assembly 204 can include a first end 904 and a second end 906. The first end 904 can be bent, deformed, or curled in such a way so as to define an opening 902 therein. Likewise, the second end 906 can be bent, deformed, or curled to define an opening 908 therein. Each of the first and second ends can be bent, deformed, or curled to form three substantially 180° curves, where the middle curve defines the respective opening 902, 908. As shown in FIG. 2, in the engaged or latched position (e.g., with the door assembly 120 in a close position), the latch assembly 204 engages the first member 102. In particular, the first horizontal wire 206 can be disposed in the opening 902 defined in the first end 904 of the latch assembly 204. As such, the door assembly 120 or the first door 200 cannot be moved along direction 602 or 702, respectively, unless the latch assembly 204 is disengaged from the first horizontal wire 206.

Figures 3, 4:
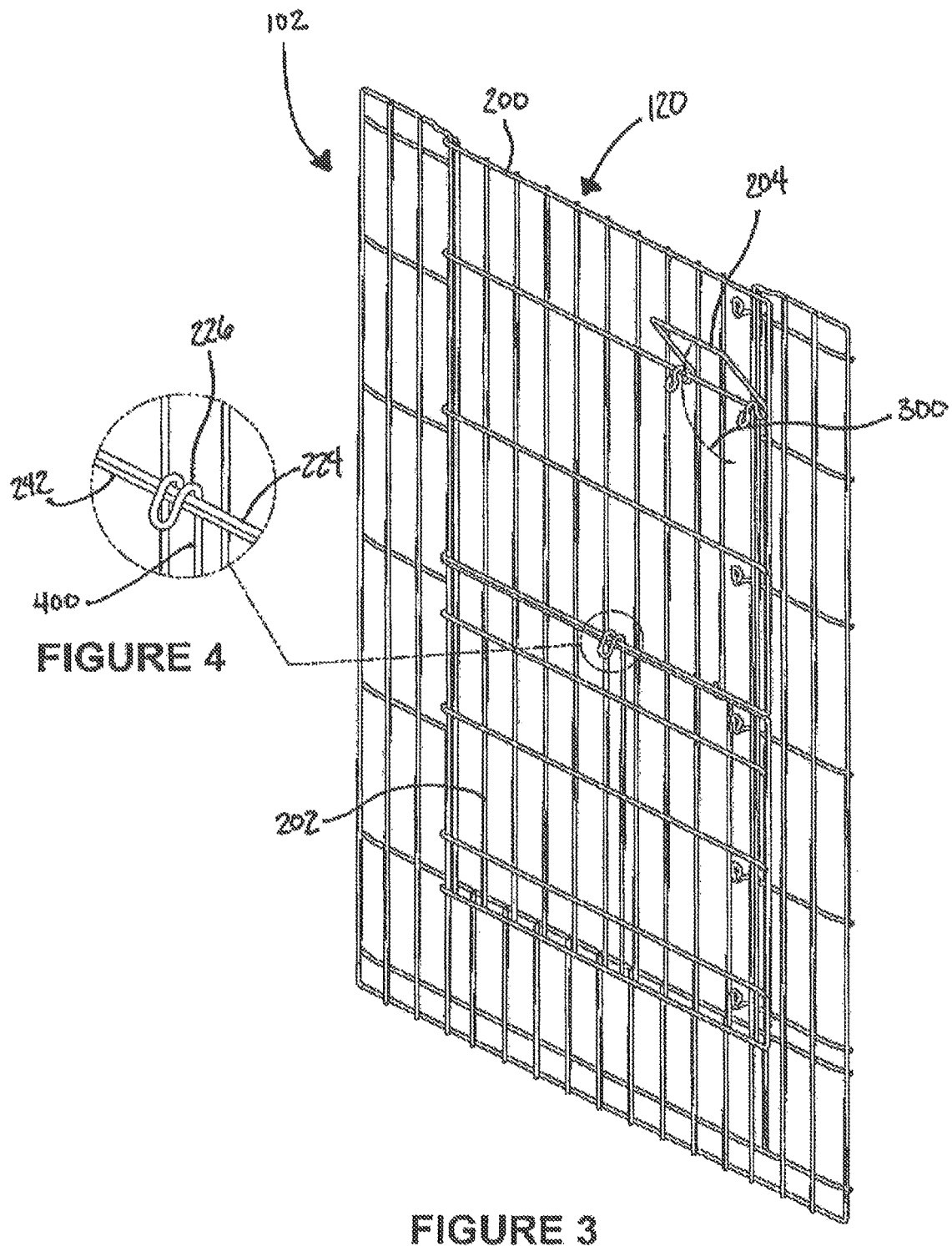
FIG. 3 is a perspective view of the door frame and door assembly of FIG. 2 with a latch in a partially open position.
FIG. 4 is an enlarged partial perspective view of a clip for coupling a first door and second door of the door assembly of FIG. 2.

As shown in FIG. 3, the latch assembly 204 can be disengaged or unlatched from the first horizontal wire 206 by moving the handle portion 900 along direction 300. In doing so, the latch assembly 204 is pivotally coupled to a horizontal latch wire 244 disposed on the first door 200. The horizontal latch wire 244 can be any horizontally-disposed wire on the door 200 that allows the latch assembly 204 to freely pivot thereabout along direction 300. The latch assembly 204, and in particular the first end 904 and second 906, can define sized openings 910, 912 respectively for receiving the horizontal latch wire 244. In addition, the formation (or bend) of the first end 904 and second end 906 can be such that the latch assembly 204 cannot be easily removed from its pivotal coupling with the horizontal latch wire 244. Thus, the latch assembly 204 can pivot relative to the horizontal latch wire 244 and allow the door assembly 120 or first door 200 to move between the open and close positions.

To further understand the manner in which the door assembly 120, and in particular the latch assembly 204, engages the first member 102, the first member 102 can define a door frame. In doing so, the first member 102 can include a first frame portion 248, a second frame portion 250, and a base portion 252. The first frame portion 248, second frame portion 250, and base portion 252 can be integrally coupled or formed from the plurality of overlapping horizontal and vertical wires that form the first member 102. The first frame portion 248 and second frame portion 250 can be substantially upright and are disposed on each side of the door assembly 120. The base portion 252 can be disposed substantially below the door assembly 120.

In the close position, the door assembly 120 can include a defined width that partially overlaps the second frame portion 250 of the first member 102. For instance, in FIG. 2, the door assembly 120 can include an overlap portion 254 that substantially overlaps the second frame portion 250. As such, the first end 904 of the latch assembly 204 is pivotally coupled to the horizontal latch wire 244 at a location disposed in the overlap portion 254 of the door assembly 120. In this arrangement, the first horizontal wire 206 has a defined length in which at least a portion of that defined length can be engaged by the first end 904 of the latch assembly 204 in the latched position.

To facilitate the pivotal movement of the door assembly 120 between the open and close positions, the first member 102 can include a substantially vertical pivot wire 218. The pivot wire 218 extends longitudinally from a first end 256 disposed in the base portion 252 to a second end 258 disposed in the first frame portion 248. The first end 256 of the pivot wire 218 is coupled to an outer frame wire 246 that defines the outer edges of the first frame portion 248, second frame portion 250, and base portion 252. The pivot wire 218 can be welded, adhered, fastened or coupled in any other manner to the outer frame wire 246.

As shown in FIG. 2, the door assembly 120 can be coupled to the pivot wire 218 via a plurality of horizontal wires on the door assembly 120 engaging the wire 218. For instance, each of the horizontal wires that form the door assembly 120 can include hooked ends that are pivotally coupled to the pivot wire 218. In FIG. 2, the first door 200 can include a first horizontal wire 214 having a first hooked end 216, a second horizontal wire 212 having a second hooked end 222, a third horizontal wire 224 having a third hooked end 232, and the horizontal latch wire 244 having a fourth hooked end 220. The second door 202 also includes a plurality of horizontal wires 228 having hooked ends. For instance, the second door 202 can include a first horizontal wire 242 having a first hooked end 230 and the remaining horizontal wires 228 having hooked ends 234, 236, 238 and 240. Each of the hooked ends on the first door 200 and second door 202 can also move substantially vertically along the pivot wire 218 to allow both doors to move vertically relative to the first member 102 and between the open and close positions.

Figure 5:
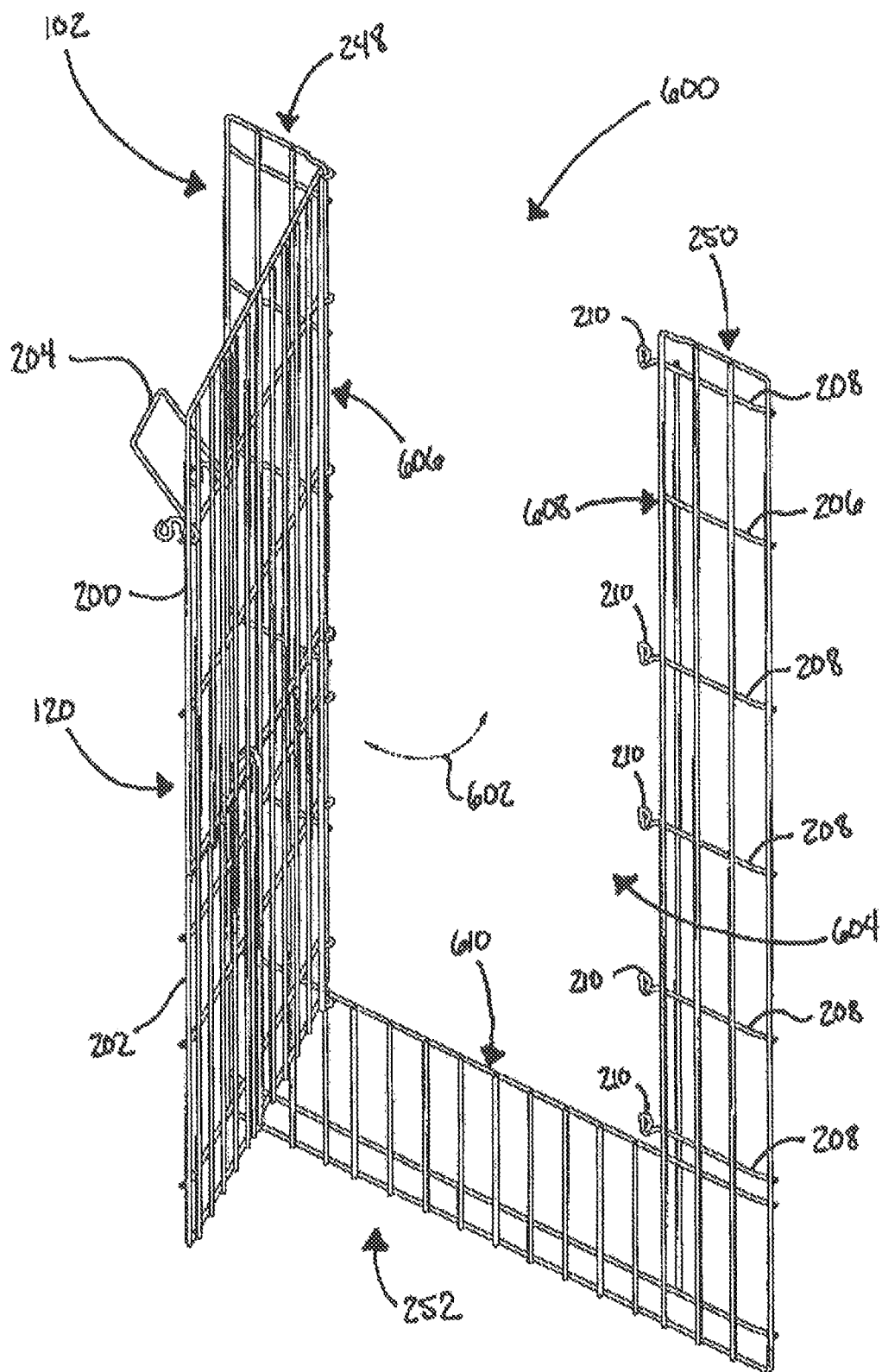
FIG. 5 is a perspective view of the door assembly of FIG. 2 in an open position.
Figures 6, 7:
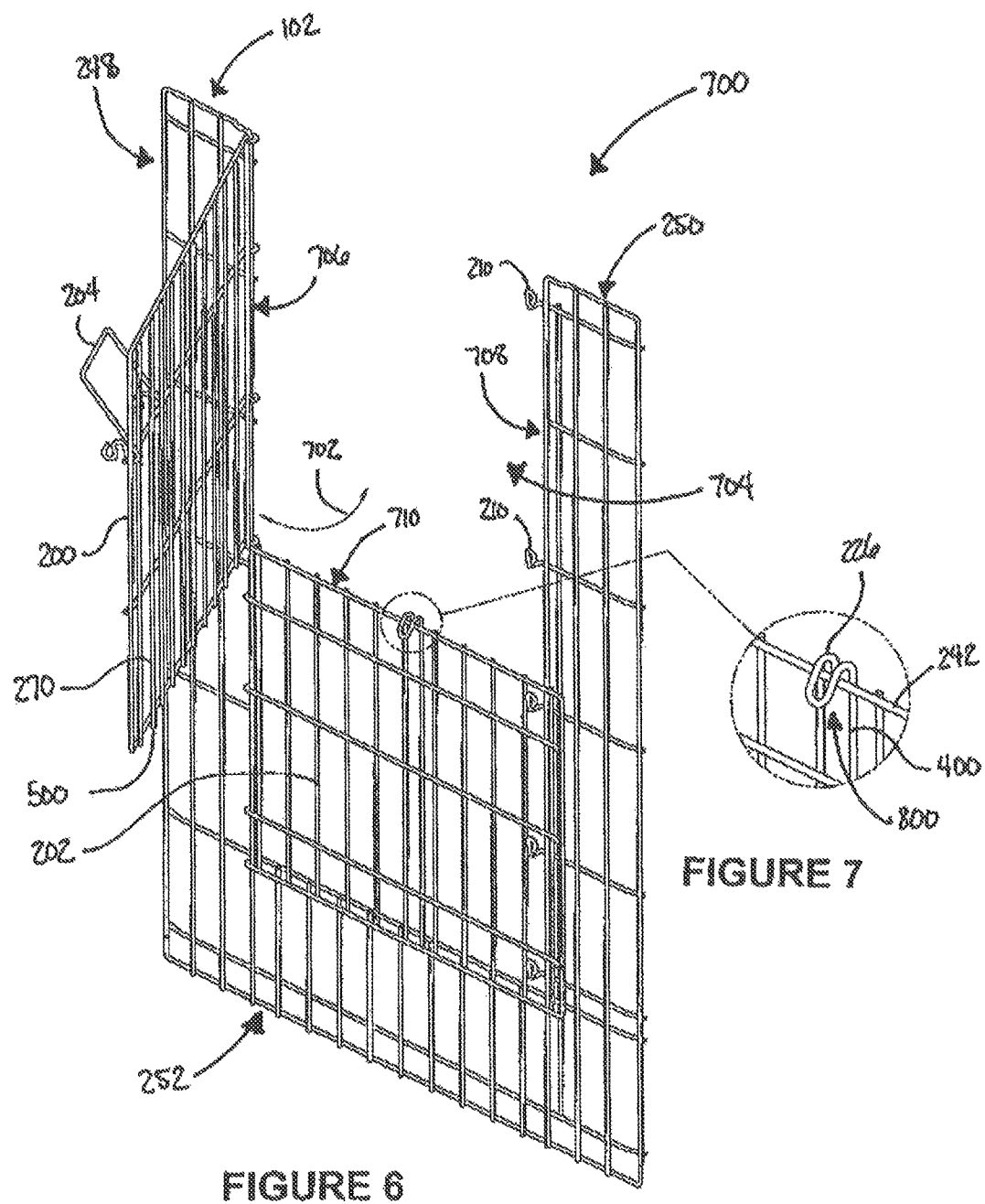
FIG. 6 is a perspective view of the first door of the door assembly in an open position and the second door in a close position.
FIG. 7 is an enlarged partial perspective view of the clip.

By enabling the first door 200 and second door 202 to move substantially vertically along the pivot wire 218, one or both doors can be moved between the open and close positions. In the illustrated embodiment, the doors would not be able to open and close if such movement was restricted due to a plurality of hooks 210 formed on the ends of at least two horizontal wires of the first member 102. As shown in FIGS. 2, 5 and 6, the second frame portion 250 of the first member 102 can include a plurality of horizontal frame wires 208. Each of the horizontal frame wires 208 can include a first end that couples to the outer frame wire 246 and an opposite end that forms one of the plurality of hooks 210.

In the close position of FIG. 2, the first horizontal wire 214 of the first door 200 can be removably coupled to the hook 210. Likewise, the second horizontal wire 212 and third horizontal wire 224 can be removably coupled to respective hooks 210. The second door 202 can be removably coupled to a plurality of hooks 210 in the close position as well. For instance, the first horizontal wire 242 and at least one of the plurality of horizontal wires 228 can engage respective hooks 210. The first horizontal wire 242 of the second door 202 and the third horizontal wire 224 of the first door 200 can be removably coupled to the same hook 210, as shown in FIG. 2. Each of the plurality of hooks 210 can be oriented either upwards or downwards to engage horizontal wires on the first door 200 and second door 202. Thus, in the illustrated embodiment of FIG. 2, the first member 102 provides a first means for securing the door assembly 120 thereto, i.e., via the plurality of hooks 210, and the door assembly 120 provides a second means for securing the door assembly 120 to the first member 102, i.e., via the first end 904 of the latch assembly 204 engaging the first horizontal wire 206 of the first member 102.

In addition, each of the plurality of hooks 210 can be disposed inwardly from an interior side 608 (FIG. 5) of the second frame portion 250. As shown in FIG. 5, each of the plurality of hooks 210 therefore may be disposed slightly offset from the interior side 608 and into the defined opening 604. Moreover, each of the plurality of hooks 210 may extend outwardly in a direction away from the interior of the enclosure 100. In this manner, to close the door assembly 120, the first door 200 and second door 202 can be pivoted along direction 602 towards the close position (e.g., FIG. 2). As the door assembly 120 approaches the close position, each of the first door 200 and second door 202 can be lifted such that both door slide vertically along the pivot wire 218 and at least one horizontal wire of the first door 200 and at least one horizontal wire of the second door 202 can be disposed in an opening formed by at least two of the hooks 210.

Referring now to FIGS. 2-7, the door assembly 120 can include one or more mechanisms for removably coupling the first door 200 and second door 202 to one another. In FIGS. 2, 4 and 7, for example, the second door 202 can include a vertical wire 400 that forms a clip 226 at one end thereof. The wire 400 can be coupled to the first horizontal wire 242 of the second door 202 via welding, adhesive, a fastener, or other known means. Alternatively, the wire 400 may only be coupled to one or more of the plurality of horizontal wires 228 that form part of the second door 202. In any event, the clip 226 can define an opening 800 (FIG. 7) therein for receiving the third horizontal wire 224 of the first door 200 in the close position. As such, the third horizontal wire 224 can be removably coupled to the clip 226. If it is desired to move only the first door 200 to a partially open position 700 as shown in FIG. 6, the third horizontal wire 224 is disengaged or decoupled from the clip 226 before the first door 200 can be moved along direction 702 towards the partially open position 700.

For purposes of this disclosure, the partially open position refers to the door assembly 120 being in a partially open position due to the second door 202 being disposed in the close position. In FIG. 5, on the other hand, both the first door 200 and second door 202 are shown in an open position and thus it is referred to in this disclosure as the embodiment of FIG. 5 being the open position. This is not intended to suggest that the first door 200 is not or cannot reach a fully open position, but rather only distinguishes the embodiments of FIGS. 5 and 6 with reference to the door assembly 120 in its entirety.

Moreover, with regards to FIG. 5, an embodiment 600 of the entire door assembly 120 is shown in the open position and an access opening 604 is defined by interior wires or edges of the first member 102. For example, the size of the opening 604 can be defined along an interior side 606 of the first frame portion 248, an interior side 608 of the second frame portion 250, and an interior side 610 of the base portion 252. In this manner, an animal can enter through the defined opening 604 as the door assembly 120 is moved along direction 602.

With regards to FIG. 6, a smaller or partial opening 704 is defined and accessible when the first door 200 is moved along direction 702. Here, the partial opening 704 is defined along an interior side 706 of the first frame portion 248, an interior side 708 of the second frame portion 250, and an interior side 710 of the second door 202, and in particular the first horizontal wire 242.

Referring to FIGS. 2 and 6, another mechanism is provided for securing the first door 200 and second door 202 to one another in the close position. More particularly, this additional mechanism can prevent an animal from moving the first door 200 relative to the second door 202 when both doors are coupled to one another or in the close position. Here, the first door 200 can include a vertical wire 270 that has a first end coupled to the first horizontal wire 214 and a second end that forms a hook end 500. In the close position of FIG. 2, for example, the first door 200 and second door 202 can be coupled to one another via the clip 226. To add further support and rigidity to the door assembly 120, however, the hook end 500 can be in contact with first horizontal wire 242 of the second door 202.

In a related aspect, the second door 202 can include a transverse, substantially U-shaped loop (not shown) that is formed by a wire coupled to the first horizontal wire 242 of the second door 202. The transverse wire can be coupled to the plurality of horizontal wires 228 of the second door 202. In this aspect, the transverse wire can define an interior space or opening (not shown) between the transverse wire and the first horizontal wire 242, such that in the close position of FIG. 2, the hook end 500 of vertical wire 270 is movably disposed in the space or opening defined between the second door 202 and transverse wire. The transverse loop may also take the form of a hook, latch, clip, or other coupling mechanism for engaging the hook end 500.

The enclosure of FIG. 1 can be collapsed to a compact or stored position. To do so, clips or fasteners can be used for coupling each of the members to one another in the assembled position (FIG. 1). By removing the clips or fasteners, the enclosure can be folded like an accordion to a compact position. In another aspect, each of the members may be hingedly or pivotally coupled to adjacent members and the entire enclosure can be folded or collapsed in an accordion-like manner.

Figure 9:
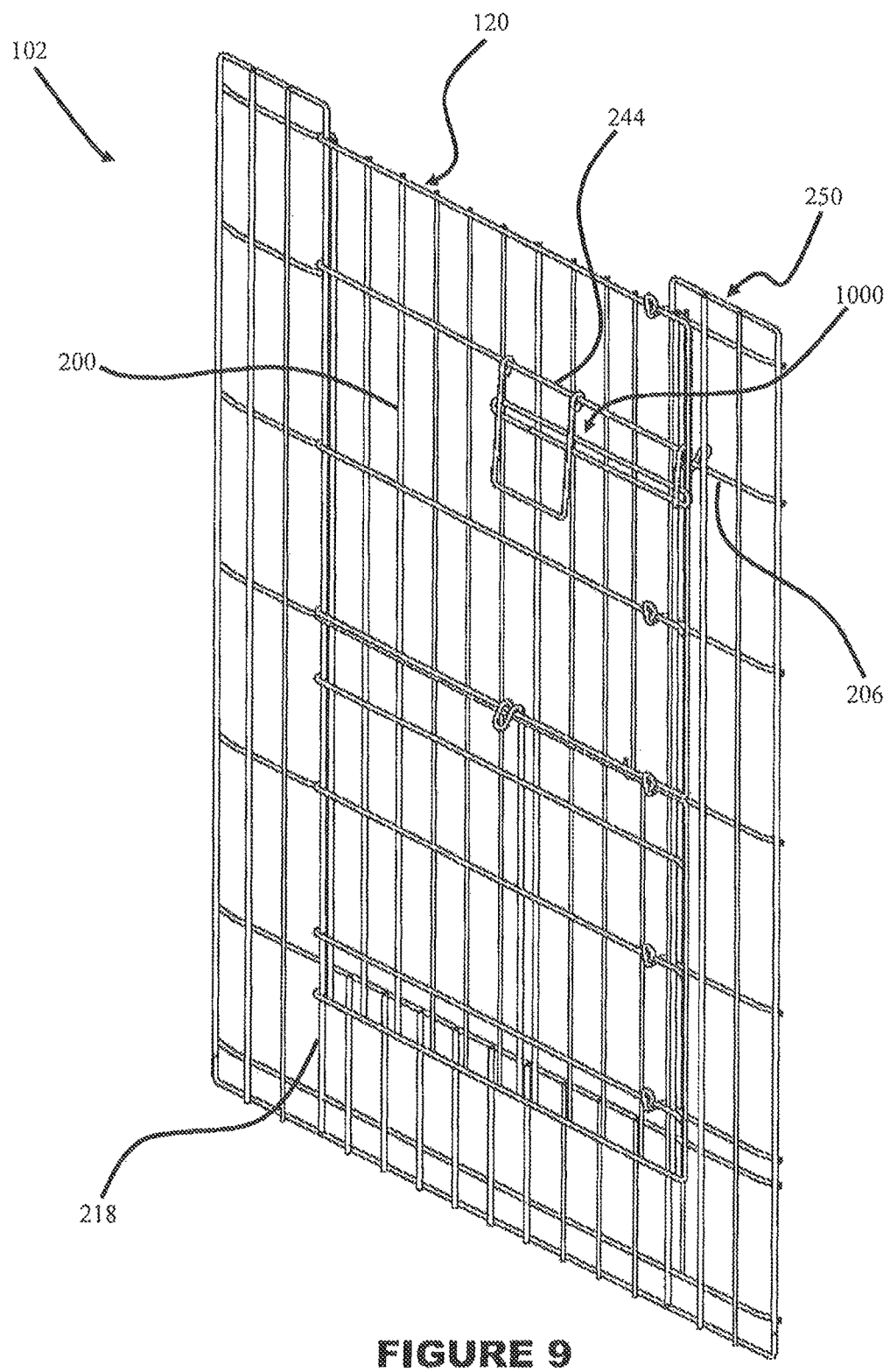
FIG. 9 is a perspective view of a door frame and door assembly of the animal enclosure of FIG. 1 in the close position with an alternative latching assembly.
Figure 10:
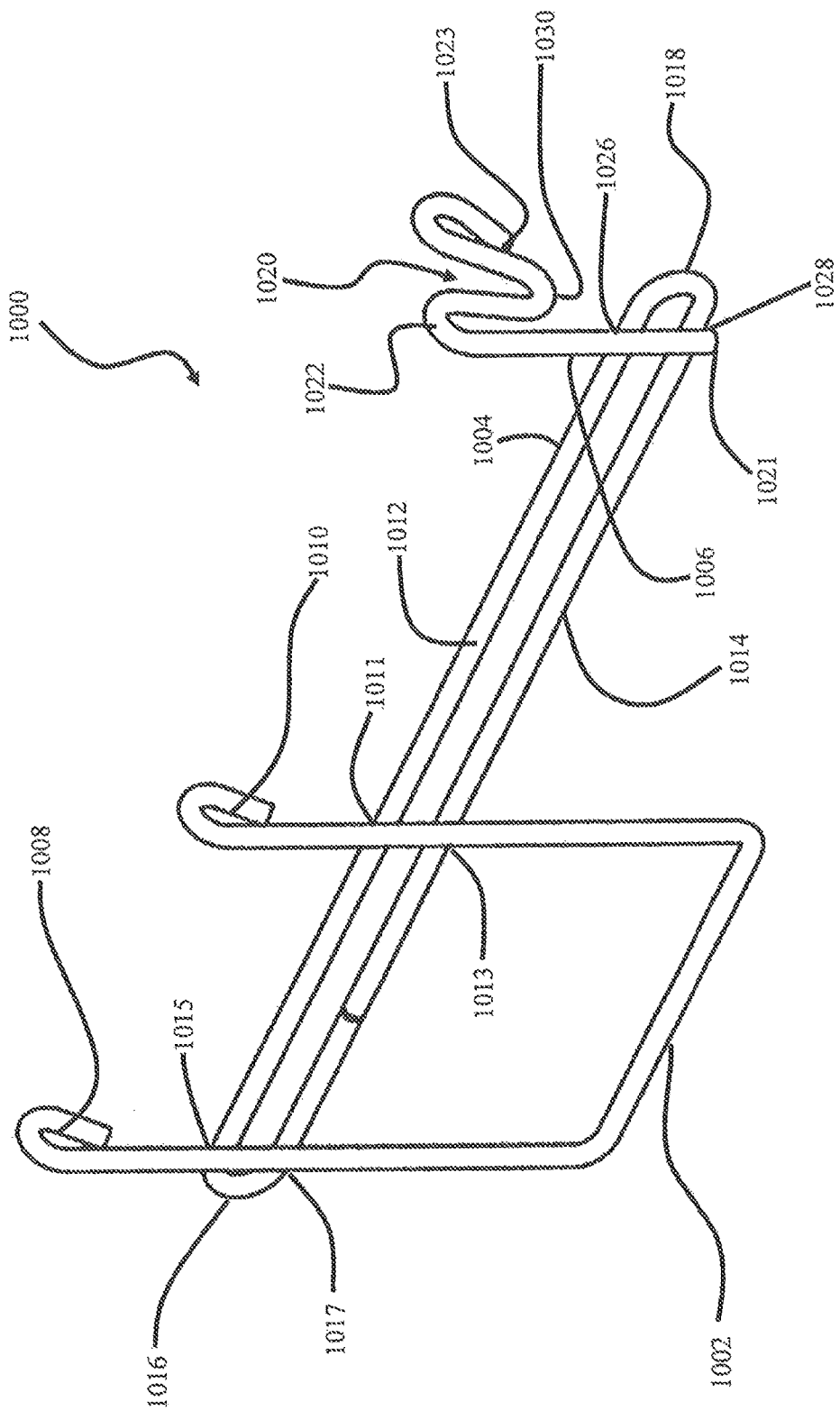
FIG. 10 is a perspective view of the alternative latching assembly of FIG. 9.

Referring to FIGS. 9 and 10, another embodiment of a latching mechanism is disclosed. The latching mechanism 1000 can consist of a first wire 1002, a second wire 1004, and a third wire 1006. The first wire 1002 may be substantially U-shaped and have a first end 1008 and a second end 1010. The first end 1008 and the second end 1010 of the first wire 1002 can be pivotally coupled to a horizontal latch wire 244. Further, the first wire 1002 can be coupled to the second wire 1004 at several locations (e.g., 1015, 1017, 1011, and 1013) spaced from the first end 1008 and the second end 1010. The first wire 1002 may be coupled to the second wire 1004 using a variety of methods such as welding, adhesive, a fastener, or other known means.

As shown in FIG. 9, the second wire 1004 can be coupled to the first wire 1002 and extend horizontally away from the vertical pivot wire 218. Further, the second wire 1004 can be coupled to the third wire 1006. The second wire 1004 can consist of a first bend 1016 and a second bend 1018 located at either side of the second wire 1006. The first bend 1016 and the second bend 1018 can be approximately 180°. In other aspects, the curvature or degree of bend of the first bend 1016 and second bend 1018 can be different from 180°. Further, the first bend 1016 and the second bend 1018 may form a first substantially horizontal portion 1012 and a second substantially horizontal portion 1014. The first substantially horizontal portion 1012 and the second substantially horizontal portion 1014 can be approximately parallel or disposed at a slight angle relative to one another. The first substantially horizontal portion 1012 and the second substantially horizontal portion 1014 can have a length defined such that both portions of the second wire 1004 can couple to the third wire 1006 and the third wire 1006 is able to be properly aligned for coupling to the first horizontal wire 206 in the close position.

The second wire 1004 can be coupled to the third wire 1006 at a first location 1026 and a second 1028 location. The second wire 1004 and the third wire 1006 can be coupled to one another at one or more locations and using any known method (e.g., welding, adhesive, fastener, etc.). One skilled in the art can understand how the specific locations and number of coupling points need only be sufficient to allow the necessary structural integrity of the coupled wires. A plurality of locations may be used to couple the wires to one another and the specific locations identified in this disclosure are not intended to be limiting.

The third wire 1006 can have a first end 1021 that is coupled to the second wire 1004 at the second location 1028 which allows the third wire 1006 to properly engage the first horizontal wire 206 in the close position. The third wire 1006 can have a second end 1023 that is bent, deformed, or curled in such a way so as to form an opening 1020 therein for receiving the first horizontal wire 206. In one example, the second end 1023 of the third wire 1006 can be bent, deformed, or curled to form three approximately 180° bends, where the opening 1020 is defined by one of the bends. Further, the first 180° bend 1022 can form an opening for pivotally receiving the horizontal latch wire 244. In this manner, the latching mechanism 1000 can be pivotally coupled to the horizontal latch wire 244 at the first end 1008 and the second end 1010 of the first wire 1002 and the opening formed by the first bend 1022 of the third wire 1006.

As shown in FIG. 9, in the engaged or latched position (e.g., with the door assembly 120 in the close position) the latch assembly 1000 engages the second frame portion 250. In particular, the first horizontal wire 206 can be disposed in the opening 1020 defined in the second bend 1030 of the third wire 1006. As such, the door assembly 120 or the first door 200 cannot be moved along direction 602 or 702 (FIGS. 5 and 6), respectively, unless the latch assembly 1000 is disengaged from the first horizontal wire 206. Similar to the manner in which ends 1008 and 1010 are pivotally coupled to horizontal latch wire 244, the third wire 1006 can be pivotally coupled to the horizontal latch wire 244 by engaging the horizontal latch wire 244 with the first bend 1022. Thus, the latch assembly 1000 can pivot relative to the horizontal latch wire 244 and allow the door assembly 120 or first door 200 to move between an open and close position.

While this particular embodiment couples three separate wires together to achieve the latching functionality, one skilled in the art can understand how a similar embodiment could consist of any number of wires and still function similarly. For instance, instead of coupling three wires to one another, a single wire could be structured to achieve substantially the same result. Alternatively, four or more wires may be structured to achieve the desired function as described herein.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A latch for releasably coupling a door to a door frame, the door frame having at least a vertical wire and a horizontal wire, and the door including a horizontal wire and being pivotable about the vertical wire between an open position and a closed position, comprising:
    a first wire formed into a substantially U-shaped structure, the first wire having a first curled end and a second curled end adapted to be pivotably coupled to the horizontal wire of the door;
    a second wire coupled to the first wire; and
    a third wire coupled to the second wire at at least two locations, the third wire forming at least a first bend and a second bend, the first bend defining an opening for receiving the horizontal wire of the door frame in the closed position and the second bend coupling to the horizontal wire of the door;
    wherein the second wire forms a first curved end and a second curved end, the first wire and second wire being coupled to one another at at least two locations near the first curved end;
    further wherein the second wire and third wire are coupled to one another at at least two locations near the second curved end.

2. The latch of claim 1, wherein the first wire is pivotable between a first position and a second position, where a pivotable movement of the first wire induces a concomitant pivotable movement of the third wire.

3. The latch of claim 1, wherein the second wire forms a substantially continuous loop.

4. The latch of claim 1, wherein the first wire and second wire are coupled to one another at at least four locations.

5. The latch of claim 1, wherein the second wire comprises a first substantially horizontal portion and a second substantially horizontal portion, where the first substantially horizontal portion and the second substantially horizontal portion each couple to the first and third wires at at least one location.

6. The latch of claim 1, wherein the third wire comprises a third bend, where the first bend, second bend, and third bend are each spaced from the at least two locations where the second and third wires are coupled to one another.

7. A latch for releasably coupling a door to a door frame of an animal enclosure, the door frame having a vertical wire and a horizontal wire, and the door including a horizontal wire and being pivotable about the vertical wire of the door frame between an open position and a closed, position, comprising:
- a first wire formed into a substantially U-shaped structure, the first wire having a first curled end and a second curled end adapted to be pivotably coupled to the door;
- a second wire coupled to the first wire; and
- a third wire coupled to the second wire and forming at least a first bend and a second bend, the first bend defining an opening for receiving the horizontal wire of the door frame in the closed position and the second bend coupling to the horizontal wire of the door;
- wherein the second wire forms a first curved end and a second curved end, the first wire and second wire being coupled to one another at at least two locations near the first curved end;
- wherein the first wire is pivotable between a first position and a second position, where a pivotable movement of the first wire induces a concomitant pivotable movement of the third wire;
- further wherein the second wire and third wire are coupled to one another at at least two locations near the second curved end.

8. The latch of claim 7, wherein the second wire forms a substantially continuous loop.

9. The latch of claim 7, wherein the first wire and second wire are coupled to one another at at least four locations.

10. The latch of claim 7, wherein the second wire comprises a first substantially horizontal portion and a second substantially horizontal portion, were the first substantially horizontal portion and the second substantially horizontal portion each couple to the first and third wires at at least one location.

11. The latch of claim 7, wherein the third wire comprises a third bend, where the first bend, second bend, and third bend are each spaced from the at least two locations where the second and third wires are coupled to one another.

12. A latch for releasably coupling a door to a door frame of an animal enclosure, the door frame having a vertical wire and a horizontal wire, and the door including a horizontal wire and being pivotable about the vertical wire of the door frame between an open position and a closed position, comprising:
- a first wire formed into a substantially U-shaped structure, the first wire having a first curled end and a second curled end adapted to be pivotably coupled to the door;
- a second wire coupled to the first wire, the second wire forming a substantially continuous loop; and
- a third wire coupled to the second wire and forming at least a first bend and a second bend, the first bend defining an opening for receiving the horizontal wire of the door frame in the closed position and the second bend coupling to the horizontal wire of the door;
- wherein the second wire forms a first curved end and a second curved end, the first wire and second wire being coupled to one another at at least two locations near the first curved end;
- wherein the first wire is pivotable between a first position and a second position, where a pivotable movement of the first wire induces a concomitant pivotable movement of the third wire;
- further wherein the second wire and third wire are coupled to one another at at least two locations near the second curved end.

13. The latch of claim 12, wherein the first wire and second wire are coupled to one another at at least four locations.

14. The latch of claim 12, wherein the second wire comprises a first substantially horizontal portion and a second substantially horizontal portion, where the first substantially horizontal portion and the second substantially horizontal portion each couple to the first and third wires at at least one location.

15. The latch of claim 12, wherein the third wire comprises a third bend, where the first bend, second bend, and third bend are each spaced from the at least two locations where the second and third wires are coupled to one another.

* * * * *